United States Patent

Furuya et al.

[11] Patent Number: 6,164,538
[45] Date of Patent: Dec. 26, 2000

[54] APPARATUS AND METHOD FOR DETERMINING TYPES OF RECORDED DATA CARDS

[75] Inventors: Yonezo Furuya, Hatoyama-machi; Susumu Kojima, Sakado, both of Japan

[73] Assignee: Nippon Conlux Co., Ltd., Tokyo, Japan

[21] Appl. No.: 09/089,625

[22] Filed: Jun. 3, 1998

[30] Foreign Application Priority Data

Jun. 5, 1997 [JP] Japan .................................. 9-147657

[51] Int. Cl.⁷ ........................................................ G06K 7/08
[52] U.S. Cl. ............................................ 235/449; 235/380
[58] Field of Search .................................. 235/380, 382, 235/382.5, 449, 492, 487

[56] References Cited

U.S. PATENT DOCUMENTS

| | | | |
|---|---|---|---|
| 4,882,474 | 11/1989 | Anderl et al. | 235/380 |
| 4,968,873 | 11/1990 | Dethloff et al. | 235/380 |
| 5,382,778 | 1/1995 | Takahira et al. | 235/380 |
| 5,594,233 | 1/1997 | Kenneth et al. | 235/492 |
| 5,640,004 | 6/1997 | Mardinian et al. | 235/492 |

*Primary Examiner*—Donald Hajec
*Assistant Examiner*—Karl D. Frech
*Attorney, Agent, or Firm*—Hogan & Hartson LLP

[57] ABSTRACT

The current invention is an apparatus and method for determining types of recorded data cards, capable of shortening card processing time, preventing card deterioration such as damage to the cards, and correctly processing recorded data cards. An apparatus for determining types of recorded data cards, without contacting the cards, has non-contacting magnetic sensors (10), which are provided adjacent to a carry path of the recorded data cards at predetermined positions thereon, and determining elements (12~16) for determining the types of the cards, as the cards are carried along the carry path, based on signals output from the magnetic sensors.

5 Claims, 8 Drawing Sheets

APPARATUS AND METHOD FOR DETERMINING TYPES OF RECORDED DATA CARDS

BACKGROUND OF THE INVENTION

1. Field of the Invention

The present invention relates to an apparatus and method for determining types of recorded data cards, and more particularly to an apparatus and method for determining whether or not a recorded data card, which has been inserted into a reader/writer, has a predetermined magnetic recording region (magnetic stripe), and whether or not the card has a predetermined integrated circuit (IC) provided thereupon, without touching the card.

2. Description of the Related Art

In recent years, there have been proposed a recorded data card on which multiple data recorded regions (magnetic stripes) are provided, and a recorded data card on which, in addition to multiple data recorded regions, an integrated circuit (IC) or the like is provided, in order to achieve benefits such as improved security and increased recording capacity. Such cards are known as complex cards.

Types of the above recorded data card include a single-stripe card, having only one magnetic stripe, and a double-stripe card, having two magnetic stripes, and the like. Conventionally known cards with integrated circuits have IC contacts of a variety of differing shapes, positions and the like.

However, card reader/writers, which are used with the above type of conventional recorded data cards, only determine whether or not a given card is of a predetermined type after the processing of the card has commenced. In other words, the reader/writer determines whether or not the card has a predetermined magnetic stripe/s, namely whether or not the magnetic stripe/s on the card is/are in a predetermined position, after the magnetic head has played back the data contained in the magnetic stripe/s. And, conventional card reader/writers are only able to determine whether or not a card has an IC contact of a predetermined shape after actually connecting to the IC contact of the card.

Therefore, even in the case of a card which does not have a predetermined magnetic stripe, the conventional card reader/writer first scans the card using a magnetic head, and, when unable to playback or record correct data, the card reader/writer identifies the card as one which does not have a magnetic stripe and processes the card accordingly. Similarly, in the case of a card which does not have an IC, or an IC card having an IC contact which is not of a predetermined shape or in a predetermined position, the conventional card reader/writer actually carries out a connection to the IC contact, and, when unable to playback or record correct data, the card reader/writer identifies the card as one which does not have a predetermined IC and processes the card accordingly.

Thus, conventional card reader/writers cannot determine whether or not a card has a predetermined magnetic stripe without actually scanning the magnetic stripe portion using a magnetic head, nor determine whether or not a card has a predetermined IC contact without actually connecting to the IC contact.

For these reasons, the card cannot be processed promptly and the card user has to wait for a considerable time. Furthermore, unnecessary magnetic scanning (sliding of the magnetic head), which is performed even when a card which has no magnetic stripe has been inserted, and unnecessary IC connection, which is performed even when a card which has no IC has been inserted, or when an IC card which does not have a predetermined IC has been inserted, cause damage and the like to the cards and consequently shorten their effective life.

SUMMARY OF THE INVENTION

It is therefore an object of the present invention to provide an apparatus and a method for determining types of recorded data cards in such a way that card processing time can be reduced, deterioration of the cards, caused by damage and the like, can be prevented, and recorded data cards can be correctly processed.

In order to achieve the above objectives, the method of the present invention for determining types of recorded data cards, which are inserted into a card reader/writer, without touching the cards, comprises: providing non-contacting magnetic sensors adjacent to a carry path of the recorded data cards at predetermined positions on the carry path; and determining types of the recorded data cards based on signals output from the magnetic sensors as the recorded data cards are carried along the carry path.

The magnetic sensors comprise magnetic inductance-type magnetic sensors which detect voltages corresponding to changes over time in a perimeter magnetic flux, induced by flowing a current, which changes over time, along a magnetic wire. The magnetic inductance-type sensors detect the voltages based on changes in an externally applied magnetic field. The recorded data card type can be determined based on the signal output from the magnetic inductance-type sensors.

In another aspect, the magnetic sensors are provided in accordance with the positions of data magnetic recording portions, provided on the recorded data cards, in which predetermined data have been recorded; and it is determined whether or not recorded data cards have the magnetic recording portions based on the existence or non-existence of a waveform, corresponding to the predetermined data, in signals which are output from the magnetic sensors.

Furthermore, in another aspect, the magnetic sensors are provided in accordance with the positions of integrated circuit contacts, which are provided on the recorded data cards and have a predetermined shape, and it is determined whether or not recorded data cards have the integrated circuits based on the existence or non-existence of a waveform, corresponding to the predetermined shape of the integrated circuit contact, in signals which are output from the magnetic sensors.

In yet another aspect of the method, the magnetic sensors comprise a first magnetic sensor, which is provided in accordance with a position of a recorded data card magnetic recording portion, in which predetermined data of a recorded data card has been recorded, and a second magnetic sensor, which is provided in accordance with a position of a recorded data card integrated circuit contact of a predetermined shape; the method comprising: determining whether or not the recorded data cards have the magnetic recording portions based on the existence or non-existence of a waveform, corresponding to the predetermined data, in signals which are output from the first magnetic sensor; and determining whether or not the recorded data cards have the integrated circuits based on the existence or non-existence of a waveform, corresponding to the predetermined shape, in signals which are output from the second magnetic sensor.

Furthermore, the apparatus for determining types of recorded data cards which have been inserted into a card reader/writer of the present invention comprises: noncontacting magnetic sensors, which are provided adjacent to a carry path of the recorded data cards at predetermined positions on the carry path; and card determining means for determining types of the recorded data cards based on signals output from the magnetic sensors as the recorded data cards are carried along the carry path.

In another aspect, the magnetic sensors comprise magnetic inductance-type magnetic sensors, being self-excited oscillators which oscillate at predetermined frequencies and having magnetic wires which function as oscillating elements thereof; the card determining means further comprising: signal extracting means for detecting signals corresponding to changes in the magnetic inductance-type magnetic sensors, the changes being generated in response to an externally applied magnetic field, and extracting the signals as voltage signals; and determining means for determining types of the recorded data cards based on the voltage signal extracted by the signal extracting means.

In another aspect, the determining means comprise signal extracting means, a reference value generator for generating a predetermined reference value, and a comparator for comparing a voltage signal from the signal extracting means with the predetermined reference value supplied by the reference value generator, the types of the recorded data cards being determined based on the result of the comparison.

In another aspect, the magnetic inductance-type magnetic sensors have magnetic shields, the magnetic shields being provided on sides of the magnetic inductance-type magnetic sensors which do not face the carry path.

In yet another aspect, the magnetic sensors are provided in accordance with positions of magnetic recording portions on the recorded data cards, in which predetermined data have been recorded; and the card determining means determine whether or not the recorded data cards have the magnetic recording portions based on the existence or non-existence of waveforms, corresponding to the predetermined data, in signals which are output from the magnetic sensors.

In another aspect of the apparatus, the magnetic sensors are provided in accordance with positions of integrated circuit contacts on the recorded data cards, having a predetermined shape; and the determining means determine whether or not the recorded data cards have the integrated circuits based on the existence or non-existence of a waveform, corresponding to the predetermined shape of the integrated circuit contact, in signals which are output from the magnetic sensors.

In a final aspect, the magnetic sensors comprise a first magnetic sensor, which is provided in accordance with a position of a recorded data card magnetic recording portion, in which predetermined data of a recorded data card has been recorded, and a second magnetic sensor, which is provided in accordance with a position of a recorded data card integrated circuit contact of a predetermined shape; the card determining means comprising: switching means for switching between a first signal, which is output from the first magnetic sensor, and a second signal, which is output from the second magnetic sensor; and determining means for determining whether or not the recorded data cards have the magnetic recording portions based on the existence or non-existence of a waveform, corresponding to the predetermined data, in the first signal supplied by the switching means, and determining whether or not the recorded data cards have the integrated circuits based on the existence or non-existence of a waveform, corresponding to the predetermined shape, in the second signal supplied from the switching means.

DESCRIPTION OF THE PREFERRED EMBODIMENTS

The preferred embodiments of the present invention will next be explained with reference to the accompanying drawings.

Figure 1:
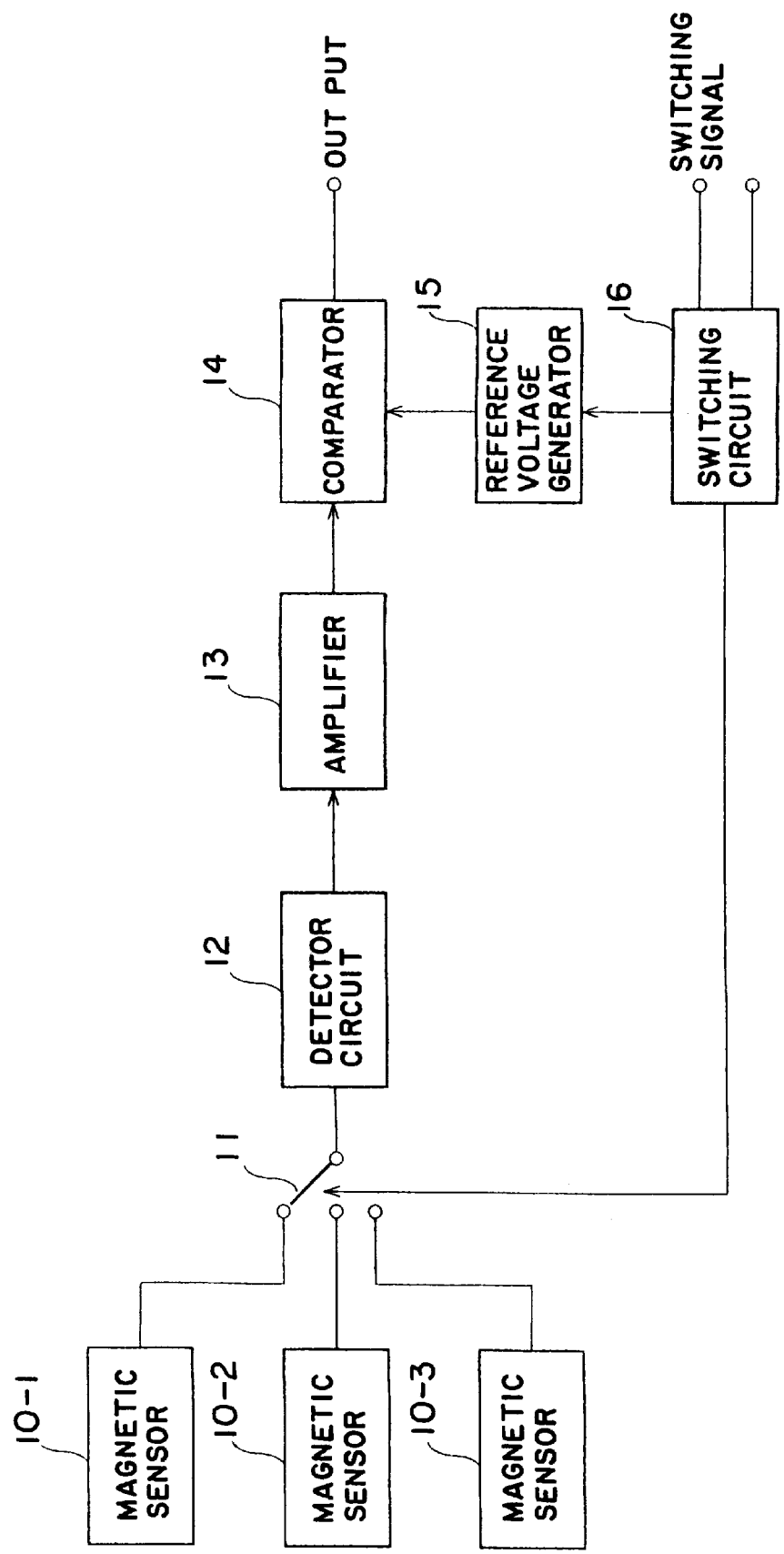
FIG. 1 is a block diagram showing a card-type determining circuit according to an embodiment of the present invention.

FIG. 1 is a block diagram showing a circuit for determining card types according to an embodiment of the invention. Practically, this card-type determining circuit comprises a computer.

Figure 2:
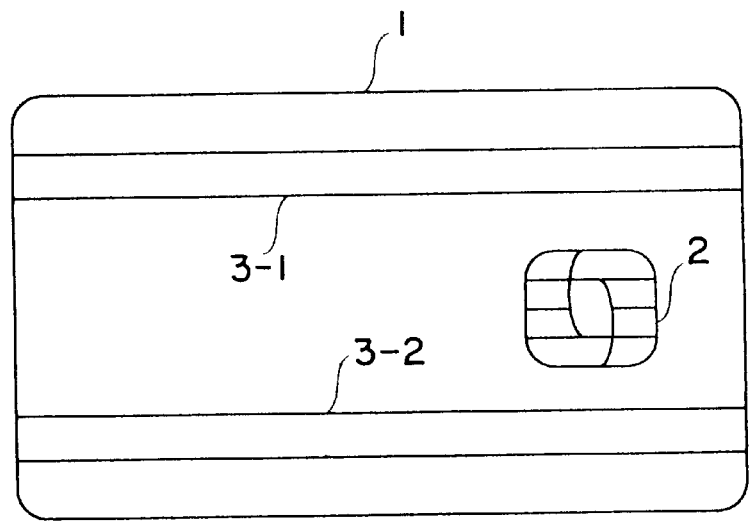
FIG. 2 is a diagram showing an example configuration of a recorded data card upon which an integrated circuit is provided.

FIG. 2 is a diagram showing an example of a configuration of the recorded data card (complex card) 1 which is used in the present embodiment. As FIG. 2 shows, the recorded data card 1 is a complex card comprising an integrated circuit (IC), not depicted in the diagram, which is buried inside the card 1, and magnetic stripes (magnetic recording regions) 3-1 and 3-2, which are provided on the surface of the recorded data card 1.

Data is recorded onto the card 1 through the IC contact 2 of the IC (not shown in the diagram) which is buried inside the card 1. Data is recorded and played back onto/from the magnetic stripes 3-1 and 3-2 using a magnetic head. The IC contact 2 is prepared by nickel-plating and then gold-plating a copper material. The internal nickel plating acts as a magnetic body and has residual magnetism.

The magnetic stripes 3-1 and 3-2 are magnetically processed by recording predetermined data thereupon. Thus the IC contact 2 and the magnetic stripes 3-1 and 3-2 can be detected by a magnetic sensor.

Returning to FIG. 1, the magnetic sensors 10-1, 10-2 and 10-3 comprise magnetic sensors using magnetic inductance. The principle of such magnetic inductance-type magnetic sensors was disclosed in Japanese Patent Laid-Open Nos. 6-176930 and 6-283344. The magnetic inductance-type magnetic sensor detects voltage corresponding to changes over time of a perimeter magnetic flux, which is induced by flowing high-frequency current along a magnetic wire. The magnetic sensor detects the voltage as changes in an externally applied magnetic field and outputs the detected result.

The magnetic sensor 10-1 detects the existence or non-existence of the magnetic stripe 3-1 on the complex card 1 shown in FIG. 2. Similarly, the magnetic sensor 10-2 detects the magnetic stripe 3-2 and the magnetic sensor 10-3 detects the IC contact 2.

A selector 11, for selecting the magnetic sensors 10-1, 10-2 and 10-3, operates in compliance with a signal sent from a switching circuit 16 and supplies the output of any one of the magnetic sensors 10-1, 10-2 and 10-3 to a detector circuit 12. An external device, which is not shown in the diagram, sends a switch signal to the switching circuit 16. The switching circuit 16 outputs to the selector 11, which performs a selection accordingly.

The detector circuit 12 detects the output of any one of the magnetic sensors 10-1, 10-2 and 10-3, which has been elected by the selector 11. For instance, the detector circuit 12 extracts an amplitude-modulated wave of a signal which has been magnetically modulated to the high-frequency current of the output of any one of the magnetic sensors 10-1, 10-2 and 10-3.

An amplifier 13 amplifies the signal which has been extracted by the detector circuit 12. Next, a comparator 14 compares the amplified signal with a reference voltage generated by a reference voltage generator 15. When the signal has a higher voltage than the reference voltage, the comparator 14 outputs a signal identifying the card as one having a magnetic stripe or an IC to the external device (not shown in the diagram).

The voltage generated by the reference voltage generator 15 varies in accordance with the selection performed by the selector 11, which is based on a signal from the switching circuit 16. This is because the reference voltages for determining the existence or non-existence of the magnetic stripe 3-1, which is detected by the magnetic sensor 10-1, the magnetic stripe 3-2, which is detected by the magnetic sensor 10-2, and the IC contact 2, which is detected by the magnetic sensor 10-3, are different.

Furthermore, the signal detected by the magnetic sensor 10-3 varies according to the shape of the IC contact 2. Therefore, by setting the reference voltage generator 15 to generate a voltage which changes over time in accordance with a predetermined shape of the IC contact 2, the comparator 14 is able to compare the signal detected by the magnetic sensor 10-3 with the reference voltage, which is supplied by the reference voltage generator 15, and thereby determine whether or not the shape of the IC contact 2 is the same as the predetermined shape. Thus, it is possible to differentiate shapes of the IC contact 2 by utilizing the fact that the output of the magnetic sensor 10-3 varies according to the shape of the IC contact 2.

Figure 3:
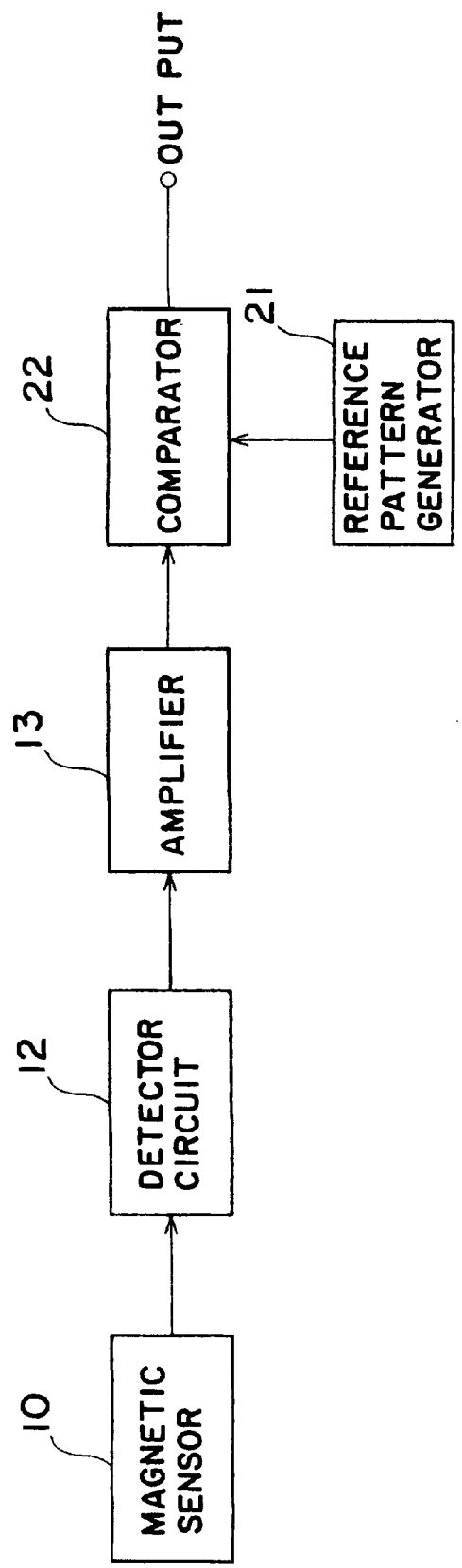
FIG. 3 is a block diagram showing how the shape of a terminal of an integrated circuit is determined according to another embodiment of the present invention.

FIG. 3 is a block diagram showing how the shape of an IC contact (an IC connection terminal) is determined based on the output of a magnetic sensor according to another embodiment of the present invention.

As FIG. 3 shows, the magnetic sensor 10 is a magnetic inductance-type magnetic sensor, and the means for extracting an amplitude-modulated wave from the magnetic sensor 10 are the same as were shown in the circuit of FIG. 1. Therefore, in FIG. 3, like members having like functions to those in FIG. 1 are designated by like reference characters and detailed explanation thereof is omitted.

An amplitude-modulated wave, which has been extracted by the detector circuit 12, is amplified by the amplifier 13 and input to a comparator 22. A signal which represents a predetermined pattern corresponding to a shape of an IC contact, is set beforehand at a reference pattern generator 21.

The comparator 22 compares the signal, which has been amplified by the amplifier 13, with the predetermined pattern signal, which has been generated by the reference pattern generator 21. When the two signals match, the comparator 22 outputs a match signal.

In other words, when the amplitude-modulated wave signal extracted by the detector circuit 12 matches the predetermined pattern signal provided by the reference pattern generator 21, the comparator 22 outputs a match signal which indicates that the card has the desired IC, namely that the card has an IC contact of the desired shape. This match signal is sent to an external device (not shown in the diagram).

Figure 4A:
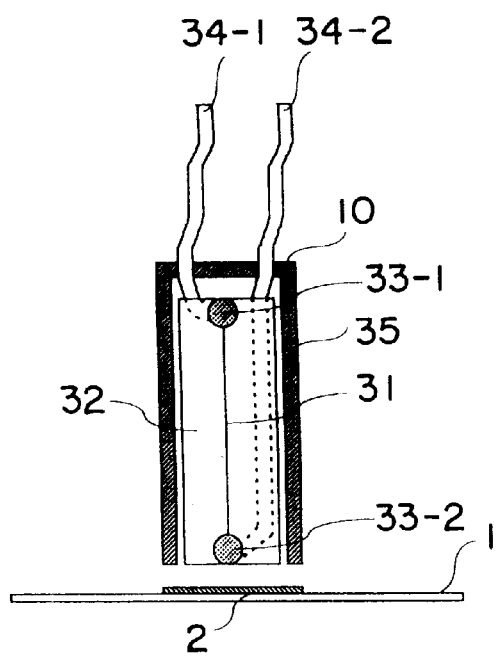
FIG. 4a shows an example configuration of a magnetic inductance-type magnetic sensor, and FIG. 4b, another example configuration of the same.
Figure 4B:
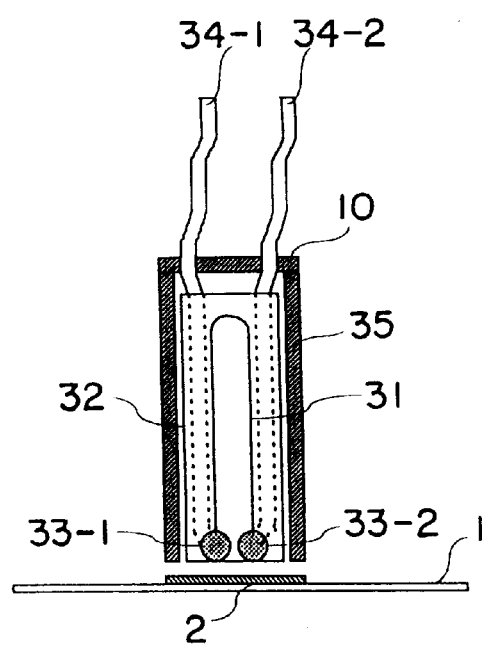
Figure 5:
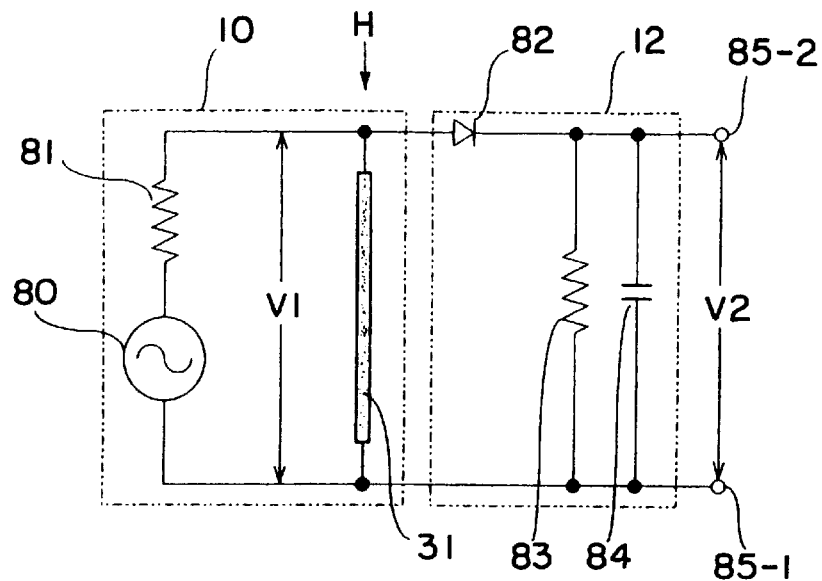
FIG. 5 is a basic circuit diagram of a magnetic inductance-type magnetic sensor.

FIG. 4a and FIG. 4b show configurations of the magnetic inductance-type magnetic sensor 10 used in each of the embodiments shown in FIG. 1 and FIG. 3. FIG. 5 shows a circuit illustrating the principle of the magnetic inductance-type magnetic sensor 10 and a detector circuit 12, and FIG. 6a and FIG. 6b, the waveform and characteristics of a signal in the primary part of the circuit of FIG. 5.

The magnetic sensor 10 in FIGS. 4a and 4b, FIG. 5, FIG. 6a and FIG. 6b utilizes the changes exhibited by impedance in response to an externally applied magnetic field. Therefore, this magnetic sensor could be used as a highly sensitive magnetic sensor, operating at room temperature, for measuring weak magnetic fields and the like.

As FIG. 4a and FIG. 4b show, a magnetic wire 31 functions as the magnetic sensor. For instance, a thin amorphous wire, or the like, of high magnetic permeability is used. The magnetic wire 31 is connected between terminals 33-1 and 33-2, which are provided at both ends of a printed circuit board 32, electricity being conducted through the magnetic wire 31. As FIG. 5 shows, leads 34-1 and 34-2 connect the magnetic wire 31, via a current-limiting resistor 81, to an oscillator 80.

Figure 6A:
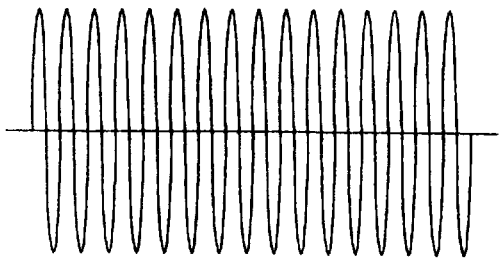
FIG. 6a and FIG. 6b are a diagram illustrating the waveform and characteristics of a magnetic inductance-type magnetic sensor.

Then, a high-frequency current, which changes over time and has the waveform shown in FIG. 6a, is applied to the magnetic wire 31 of the magnetic sensor 10. This flow of high-frequency current through the magnetic wire 31 causes a skin effect, enabling the inductance and impedance of the magnetic sensor to be altered by an external magnetic field. Utilizing the fact that the inductance of the magnetic sensor changes when an external magnetic field H is applied along the length of the magnetic wire 31, the detector circuit 12 extracts an amplified signal, which is proportionate to the strength of the external magnetic field H, from the output of the magnetic sensor 10, to be used as a voltage signal.

Figure 6B:
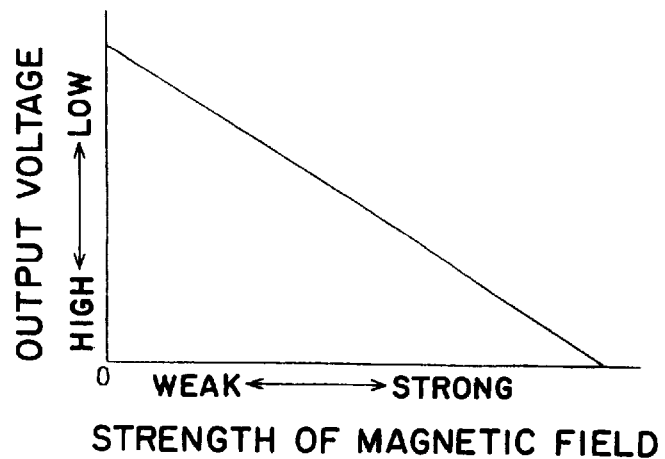

The detector circuit 12 comprises a smoothing circuit, having a diode 82, a resistor 83 and a capacitor 84. FIG. 6b shows the characteristics of a voltage signal which is extracted between the output terminals 85-1 and 85-2 of the detector circuit 12. As these characteristics show, the extracted voltage signal is proportionate to the size of the dc component of the external magnetic field. In other words, when the external magnetic field H is weak, the voltage between the output terminals 85-1 and 85-2 of the detector circuit 12 increases. Conversely, when the external magnetic field H is strong, the voltage between the output terminals 85-1 and 85-2 decreases. Therefore, it is possible to determine the strength of the external magnetic field H from the size of the voltage between the output terminals 85-1 and 85-2.

Furthermore, as FIG. 4a and FIG. 4b show, with the exception of the side facing the recorded data card, the sides of the magnetic inductance-type magnetic sensor 10 are covered by a magnetic shield 35, in order to improve detection precision by reducing external magnetic interference. In other words, the magnetic shield 35 is capable of blocking leaked magnetic flux, caused by the power of the card reader/writer (not shown in the diagram) or a carrying motor 72, such as that shown in FIG. 9, for carrying the recorded data cards, or the like. This improves the S/N ratio of signals detected from the magnetic sensor 10, and consequently improves detection precision.

Figure 7:
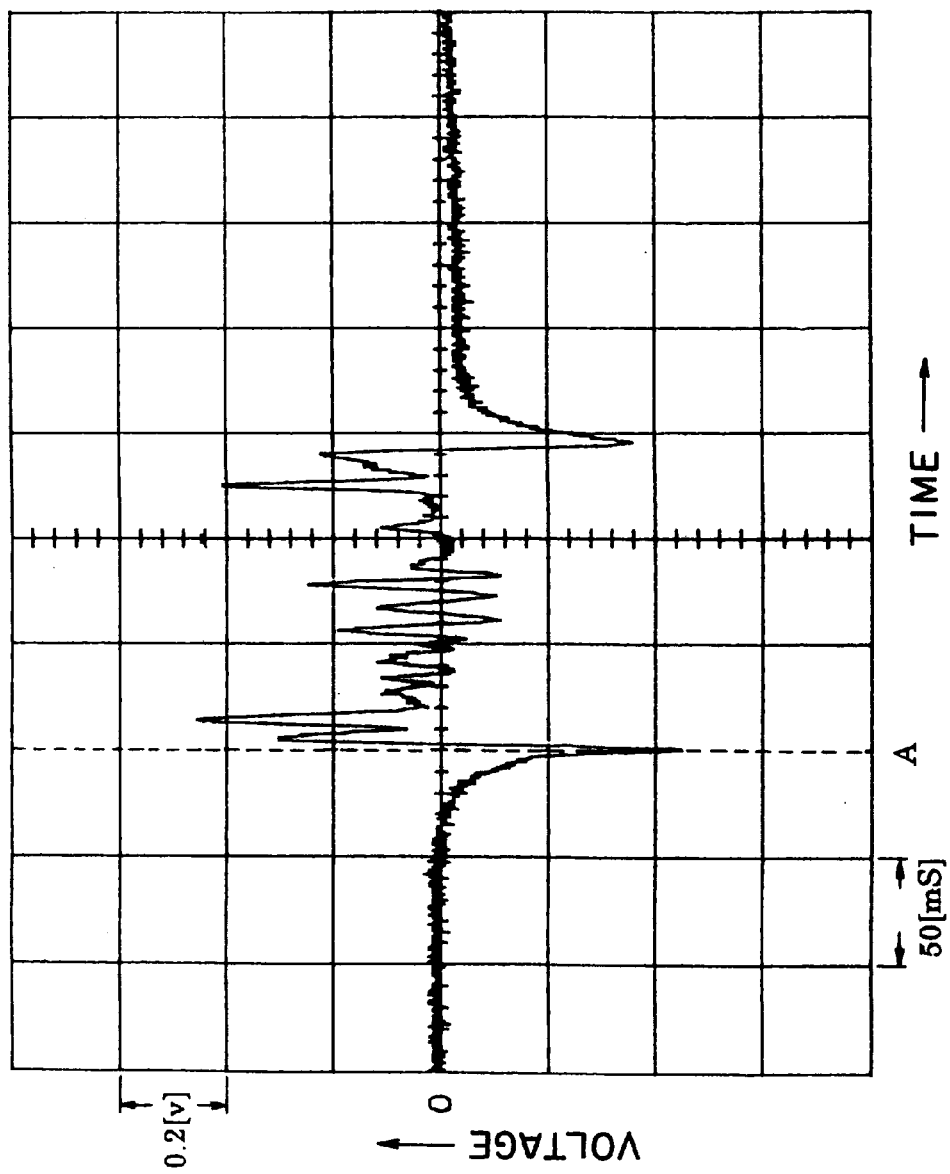
FIG. 7 is a diagram showing an example of an output of a magnetic inductance-type magnetic sensor when a magnetic record region has been detected.

FIG. 7 shows an example of a detection output from the magnetic inductance-type magnetic sensor 10-1 in a case where a magnetic stripe 3-1 is provided on the recorded data card 1. When the card 1, which is being carried through, reaches a position where the magnetic stripe 3-1 on the card is facing the magnetic inductance-type magnetic sensor 10-1, the output from the magnetic inductance-type magnetic sensor 10-1 starts to oscillate (position A in FIG. 7). The size differences in the waveform of the detection output at this point are due to the different magnetic field strengths which have been detected. The strength of a magnetic field can be determined from the size of the waveform of the detected output.

Figure 8:
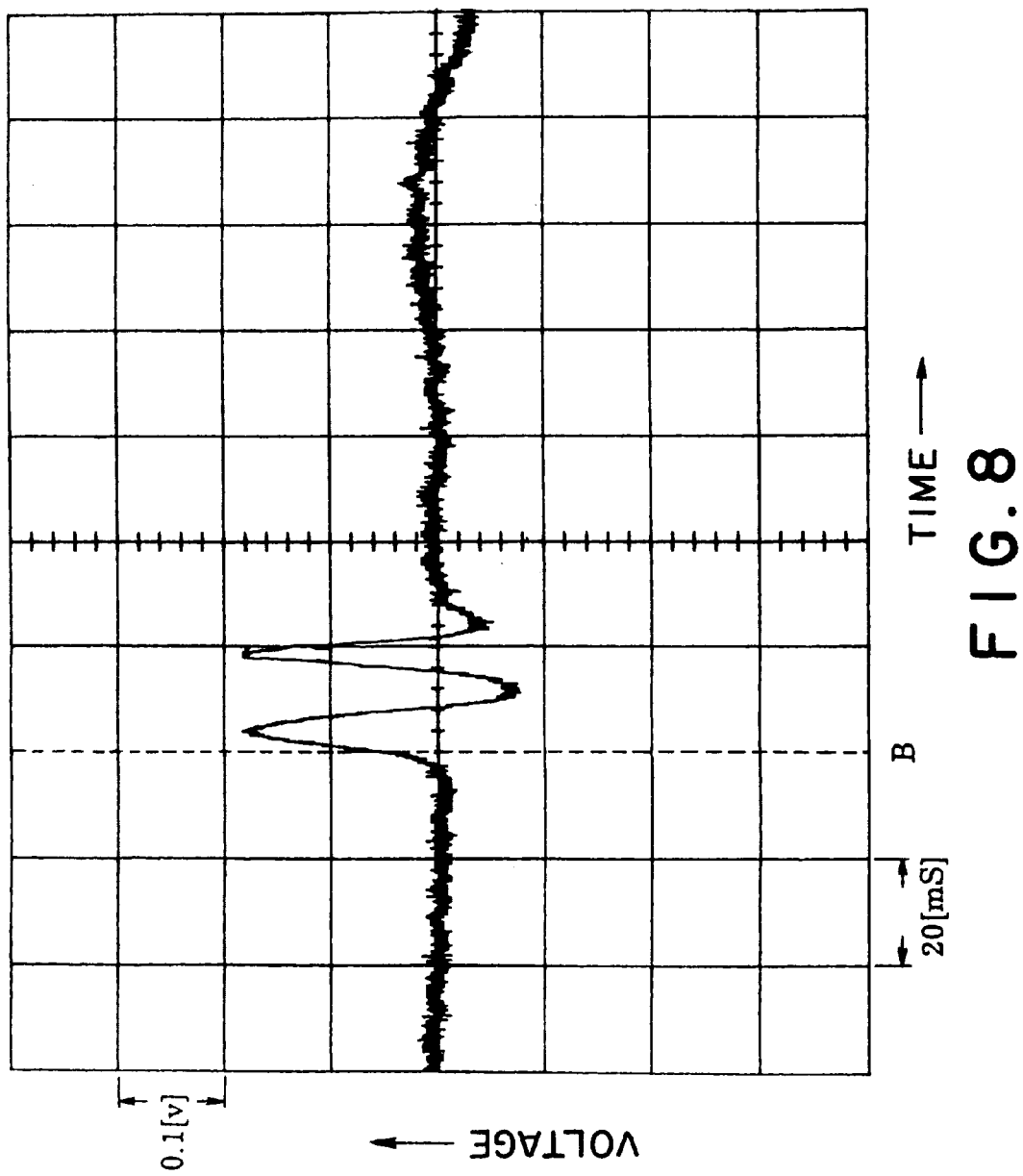
FIG. 8 is a diagram showing an example of an output of a magnetic inductance-type magnetic sensor when the terminal of an integrated circuit has been detected.

FIG. 8 shows an example of a detection output from the magnetic inductance-type magnetic sensor 10-3 in a case where the recorded data card 1 has an IC which has an IC contact 2.

When the recorded data card 1, which is being carried through, reaches a position where the IC contact 2 is facing the magnetic inductance-type magnetic sensor 10-3, the detection output from the magnetic inductance-type magnetic sensor 10-3 starts to oscillate (position B in FIG. 8). However, noise, which has become mixed into the circuit, causes the magnetic inductance-type magnetic sensor 10-3 to oscillate close to 0[v] prior to the detection of the IC contact 2 (the position on the left side of B in FIG. 8). Now, the sizes of the output waveforms are roughly equal due to the fact that the strength of the residual magnetism of the IC contact 2 is roughly constant. The shape of the IC contact 2 can be determined by comparing the output waveform with a predetermined waveform.

Figure 9:
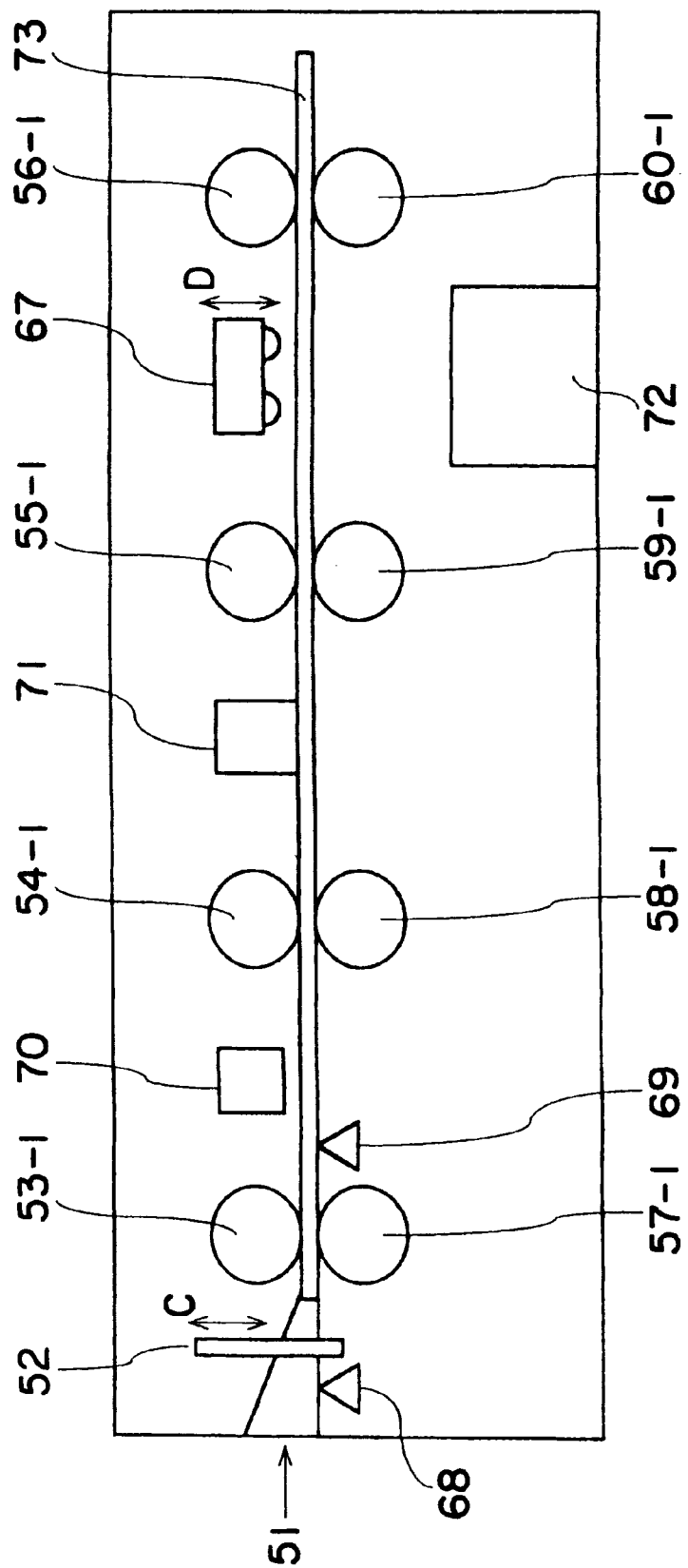
FIG. 9 is a side view schematically illustrating an embodiment of a card reader/writer in which the configuration of FIG. 1 has been accomplished.
Figure 10:
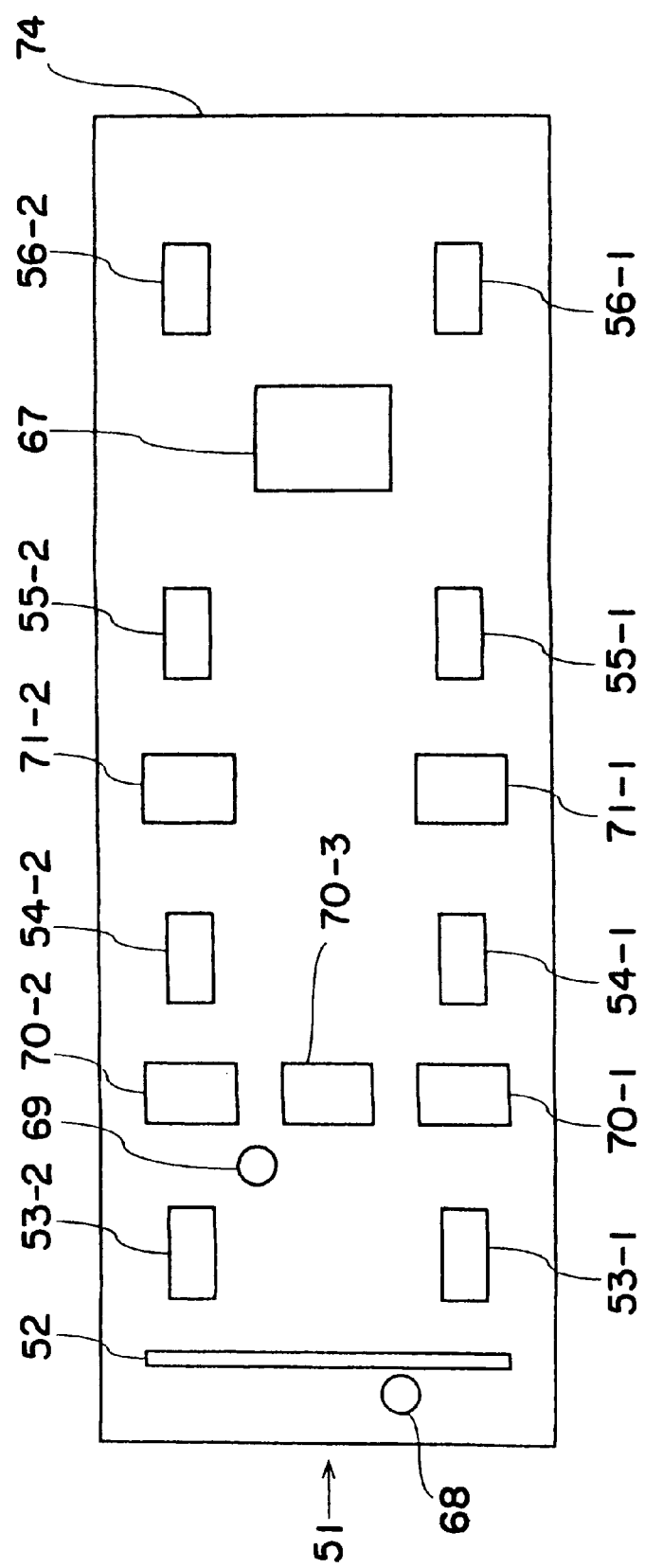
FIG. 10 is a front view of the embodiment of the card reader/writer in which the configuration of FIG. 1 has been accomplished shown in FIG. 9.

FIG. 9 is a side view of an embodiment of a card reader/writer according to the present invention, and FIG. 10, a front view of the same.

As FIG. 9 and FIG. 10 show, the card reader/writer of the present embodiment comprises a card insertion entrance 51, which is opened and closed by an opening/closing shutter moving along the direction indicated by symbol C, driving rollers 53-1, 53-2, 54-1, 54-2, 55-1, 55-2, 56-1, 56-2, 57-1, 57-2, 58-1, 58-2, 59-1, 59-2, 60-1 and 60-2, four pairs of which are provided respectively above and below a card carry path 73, for carrying an inserted card along the card carry path 73, an insertion sensor 69 for detecting a card at the card insertion entrance 51, a magnetic sensor 70-1 for detecting a magnetic stripe 3-1 (FIG. 2) on a card being carried along the card carry path 73, a magnetic sensor 70-2 for detecting a magnetic stripe 3-2 (FIG. 2), a magnetic sensor 70-3 for detecting an IC contact 2 (FIG. 2), a magnetic head 71-1 for recording and playing back data corresponding to the magnetic stripe 3-1 on a card being carried along the card carry path 73, a magnetic head 71-2 for recording/playing data corresponding to the magnetic stripe 3-2, and a carrying motor 72 for driving the driving rollers 53-1~56-2 and 57-1~60-2.

Next, the operation of the above card reader/writer will be described.

Firstly, an entrance sensor 68 detects that a card has been inserted through the card insertion entrance 51, and the shutter 52 opens in compliance with the output from the entrance sensor 68. Then, the card is inserted still further inside the card reader/writer 74. When the insertion sensor 69 has detected the presence of the inserted card, the carrying motor 72 is activated, whereby the card is carried along the card carry path 73 by the driving rollers 53-1~56-2 and 57-1~60-2.

As the card is carried along the card carry path 73, the magnetic sensor 70-1 first detects whether or not the card has the magnetic stripe 3-1. Then, the magnetic sensor 70-2 detect whether or not the card has the magnetic stripe 3-2. Next, the magnetic sensor 70-3 detects whether or not the card has the IC contact 2.

When the magnetic stripes 3-1 and 3-2 have been detected on a card which has been carried along the card carry path 73, magnetic heads 71-1 and 71-2 record and/or play back data from/to the magnetic stripes 3-1 and 3-2.

When the card has reached the end of the card carry path 73, in the case where the IC contact 2 has been detected, an IC contact contacting portion 67 makes contact with the IC contact 2. Consequently, data is recorded or played back from/to an integrated circuit (IC) which is buried inside the card (but not shown in the diagram).

But, when no magnetic stripes 3-1 and 3-2 are detected from an inserted card, the card reader/writer 74 does not perform scanning. And, when no IC contact 2 has been detected from an inserted card, or when a detected IC contact 2 does not have the predetermined shape and is not in the predetermined position, the IC contact contacting portion 67 does not carry out the contacting operation.

In the case where the inserted card has neither the predetermined magnetic stripes 3-1 and 3-2 nor the predetermined IC contact 2, the card reader/writer 74 ejects the card immediately after the card type has been determined.

The embodiments described above referred to the examples of a magnetic recording card and an IC card, but the present invention is not limited to these and is applicable for any type of card having a magnetically detectable data recorded portion.

According to the present invention explained above, non-contacting magnetic sensors are provided on the card carry path of the card reader/writer, and it is determined whether or not an inserted recorded data card has a magnetic recording region, or an integrated circuit, based on the outputs of the magnetic sensors. Therefore, magnetic recording regions and integrated circuits can be detected without having to scan the magnetic recording regions or connect to the contacts of the integrated circuits. Consequently, card processing time can be shortened and card deterioration, caused by damage and the like, can be prevented, and recorded data cards can be correctly processed.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. A device for preliminarily determining types of recorded data cards, said device includes a card carry path which has at least a sensor, so that types of cards are determined based upon the output from said sensor when a recorded data card having a magnetic recording region and an IC carrying region passes through said card carry path, the device comprising:

a first non-contacting magnetic sensor disposed at a first predetermined position where said magnetic recording region passes through, for detecting the magnetic characteristic of said magnetic recording region;

a second non-contacting magnetic sensor disposed at a second predetermined position where said IC carrying region passes through, for detecting the magnetic characteristic of said IC carrying region;

a reference signal generating circuit for producing a first reference signal corresponding to said first magnetic sensor, and a second reference signal corresponding to said second magnetic sensor in response to a switching signal; and a comparator for comparing the respective outputs from said first and second magnetic sensors with the respective reference signals in response to the switching signal.

2. The device according to claim 1, wherein said first and second non-contacting magnetic sensors produce voltage signals when detecting the magnetic characteristic from said recorded data card, said reference signal generating circuit produces voltage reference signals, and said comparator compares the voltage signals from said first and second non-contacting magnetic sensors with the respective voltage reference signals.

3. The device according to claim 1, wherein said reference signal generating circuit has a pattern generating circuit for producing a reference pattern representing a magnetic characteristic of said IC carrying region; and said comparator has a pattern comparing circuit for comparing the signal detected by said second non-contacting magnetic sensor with the reference pattern by said reference pattern generating circuit.

4. The device according to claim 1, wherein said first and second non-contacting magnetic sensors are constituted as magnetic inductance-type magnetic sensors.

5. The device according to claim 1, wherein said device includes a pair of said first non-contacting magnetic sensors provided at positions corresponding to both sides of said recorded data card in widthwise direction; and said second non-contacting magnetic sensor is provided at a position corresponding to a. central position of said recorded data card in widthwise direction.

* * * * *